(12) United States Patent
Liikanen et al.

(10) Patent No.: US 6,256,160 B1
(45) Date of Patent: Jul. 3, 2001

(54) PROGRAMMABLE, VARIABLE DATA TRACK PITCH

(75) Inventors: Bruce A. Liikanen, Berthoud; Lance R. Carlson, Niwot, both of CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/133,917

(22) Filed: Aug. 13, 1998

(51) Int. Cl.[7] .................................................. G11B 5/09
(52) U.S. Cl. ....................... 360/48; 360/77.08; 360/78.14
(58) Field of Search ............................. 360/77.08, 78.14, 360/48, 75, 105

(56) References Cited

U.S. PATENT DOCUMENTS

| | | | |
|---|---|---|---|
| 4,631,723 | * 12/1986 | Rathbun et al. | 371/10 |
| 5,396,240 | 3/1995 | Schowe | 341/97 |
| 5,500,776 | * 3/1996 | Smith | 360/77.04 |
| 5,570,247 | * 10/1996 | Brown et al. | 360/75 |
| 5,600,506 | * 2/1997 | Baum et al. | 360/78.14 |
| 5,761,007 | * 6/1998 | Price et al. | 360/106 |
| 5,940,237 | * 8/1999 | Takagi | 360/75 |
| 5,999,351 | * 12/1999 | Albrecht et al. | 360/48 |
| 6,052,250 | 4/2000 | Golowka et al. | 360/77.08 |

OTHER PUBLICATIONS

Jorgensen, "The Complete Handbook of Magnetic Recording," 4th ed. 1996, pp. 479–489 and 498–507.

* cited by examiner

*Primary Examiner*—David Hudspeth
*Assistant Examiner*—Dan I. Davidson
(74) *Attorney, Agent, or Firm*—David M. Sigmond

(57) ABSTRACT

A disk drive system having a disk used to store information is disclosed. In one embodiment, the disk includes a servo track having a servo track pitch and a data track having a data track pitch. The servo track pitch and the data track pitch are unequal to one another. A method of reading data from a disk is also disclosed. The method includes the steps of: (1) providing a plurality of servo tracks, each having a track number; (2) providing a plurality of data tracks each having a data track number, wherein the number of servo tracks within a particular region of a disk are related to the number of data tracks within the particular region by a ratio defined as a TPI scale factor; (3) obtaining instructions from a host to read from a particular data track number; and (4) determining which servo track number should be used to access the particular data track.

51 Claims, 6 Drawing Sheets

PROGRAMMABLE, VARIABLE DATA TRACK PITCH

FIELD OF THE INVENTION

The present invention relates to magnetic storage devices and, more particularly, to computer disk drives.

BACKGROUND OF THE INVENTION

A disk drive system is a digital data storage device that stores information within concentric tracks on a storage disk. The storage disk is coated with a magnetic material that is capable of changing its magnetic orientation in response to an applied magnetic field.

During operation of a disk drive,the disk is rotated about a central axis at a substantially constant rate. To read data from or write data to the disk, a magnetic transducer is positioned above a desired track of the disk while the disk is spinning.

Writing is performed by delivering a write signal having a variable current to the transducer while the transducer is held close to the desired track. The write signal creates a variable magnetic field at a gap portion of the transducer that induces magnetic polarity transitions into the desired track. The magnetic polarity transitions are representative of the data being stored.

Reading is performed by sensing the magnetic polarity transitions on a track with the transducer. As the disk spins below the transducer, the magnetic polarity transitions on the track present a varying magnetic field to the transducer. The transducer converts the varying magnetic field into an analog read signal that is then delivered to a read channel for appropriate processing. The read channel converts the analog read signal into a properly timed digital signal that can be further processed and then provided to a host computer system.

The transducer can include a single element, such as an inductive read/write element for use in both reading and writing, or it can include separate read and write elements. Transducers that include separate elements for reading and writing are known as "dual element heads" and usually include a magneto-resistive (MR) read element for performing the read function.

Dual element heads are advantageous because each element of the transducer can be optimized to perform its particular function. For example, MR read elements are more sensitive to small variable magnetic fields than are inductive heads and, thus, can read much fainter signals from the disk surface. Because MR elements are more sensitive, data can be more densely packed on the surface with no loss of read performance.

MR read elements generally include a strip of magneto-resistive material that is held between two magnetic shields. The resistance of the magneto-resistive material varies almost linearly with the applied magnetic field. During a read operation the MR strip is held near a desired track, specifically, within the varying magnetic field caused by the magnetic transitions on the track. A constant current is passed through the strip resulting in a variable voltage across the strip. By Ohm's law (i.e., V=IR), the variable voltage is proportional to the varying resistance of the MR strip and, hence, is representative of the data stored within the desired track. The variable voltage signal (which is the analog read signal) is then processed and converted to digital form for use by the host.

A standard disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22, which is attached to an actuator arm 24 that can rotate about a bearing assembly 26. The actuator arm assembly 18 includes a voice coil motor (VCM) 28, which moves the transducer 20 relative to the disk 12. The spin motor 14, VCM 28 and transducer 20 are coupled to a number of electronic circuits 30 mounted to a printed circuit board 32. The electronic circuits 30 typically include one or more read channel chips, a microprocessor-based controller and a random access memory (RAM), among other things.

Instead of having a single disk 12 as shown in FIG. 1, as is well-known in the art, the disk drive 10 may include a plurality of disks 12. In such case, each of the plurality of disks 12 would have two sides, with magnetic material on each of those sides. Therefore, two actuator arm assemblies 18 would be provided for each disk 12.

Referring now to FIG. 2, data is stored on the disk 12 within a number of concentric radial tracks 40 (or cylinders). Each track is divided into a plurality of sectors 42. Each sector 42 is further divided into a servo region 44 and a data region 46.

The servo regions 44 of the disk 12 are used to, among other things, accurately position the transducer 20 so that data can be properly written onto and read from the disk 12. The data regions 46 are where non-servo related data (i.e., user data) is stored and retrieved. Such data, upon proper conditions, may be overwritten.

FIG. 3 shows portions of tracks 40 for a disk 12 drawn in a straight, rather than arcuate, fashion for ease of depiction. To accurately write data to and read data from the data region 46 of the disk 12 (see FIG. 2), it is desirable to maintain the transducer 20 in a relatively fixed position with respect to a given track's centerline 48 during each of the writing and reading procedures. Tracks n−1 through n+4, including their corresponding centerlines 48, are shown in FIG. 3.

To assist in controlling the position of the transducer 20 relate to the track centerline 48, the servo region 44 contains, among other things, servo information in the form of servo patterns 50 comprised of one or more groups of servo bursts, as is well-known in the art. First, second, third and fourth servo bursts 52, 54, 56, 58 (commonly referred to as A, B, C and D servo bursts, respectively) are shown in FIG. 3. The servo bursts 52, 54, 56, 58 are accurately positioned relative to the centerline 48 of each track 40. Unike information in the data region 46, servo bursts 52, 54, 56, 58 may not be overwritten or erased during normal operation of the disk drive 10.

As the transducer 20 is positioned over a track 40 (i.e., during a track following procedure), it reads the servo information contained in the servo regions 44 of the track 40, one servo region 44 at a time. The servo information is used to, among other things, generate a position error signal (PES) as a function of the misalignment between the transducer 12 and a desired position relative to the track centerline 48. As is well-known in the art, the PES signals are input to a servo control loop (not shown) which performs calculations and outputs a servo compensation signal which controls the VCM 28 to, ideally, place the transducer 12 at the desired position relative to the track centerline 48.

In addition to performing the track following procedure described above, each track's servo region 44 contains information which is used to position the transducer 20 over an appropriate track 40 and servo region 44 (i.e., to perform seek operations) so that user data may be read from that track's data region 46. More specifically, as shown in FIG. 4, each servo region 44 contains a write/read (W/R) recovery field 60, an automatic gain control (AGC) field 62, a synchronization field 64, a sector number field 66, a cylinder number field 68 and a PES field 70. (The PES field 70 is comprised of servo patterns 50, as described above with reference to FIG. 3).

The W/R field 60 is used by the disk drive 10 to transition from writing data to a previous data region 46 to reading the servo information in the present servo region 44. The AGC field 62 is used to set the gain of the read/write channel (not shown) of the disk drive 10 for optimal performance. The synchronization field 64 is used in synchronizing a system clock so that the sector and cylinder number fields 66, 68 can be read, and so that the PES field 70 can be located.

As is well-known in the art, the sector number field 66 is indicative of the circumferential position of the servo region 44 with respect to the disk 12. Similarly, the cylinder number field 68 includes an address identifying the particular track 40 on which the servo region 44 is located (i.e., the radial position of the servo region 44).

A servo track writer (STW) (not shown) is used to write the servo regions 44, including their corresponding fields, onto the surface(s) of the disk 12 during the manufacturing process. In most present systems, the STW controls write heads (not shown) corresponding to each disk surface of the disk drive system, which write heads are also used to write user data to each disk surface during standard operation of the disk drive. In order to precisely write the servo information onto each surface of the disk 12, the STW directs each write head to write in small steps, with each step having a width (i.e., STW step width 72 as shown in FIG. 5).

FIG. 5 illustrates the relationship between the STW step width 72 and the pitch 74 of the servo region 44 for a conventional system. A for convenience, the tracks 40 are shown as being straight, rather than arcuate, for ease of depiction.

Prior to proceeding further, certain terms should be defined. Specifically, the difference between the terms "pitch" and "width" must be delineated. The term "pitch" is the distance between centers of adjacent regions on the surface of a disk 12. For example, a servo track pitch 74 (shown in the data region 46 of FIG. 5 for convenience) is defined as the distance between the centers of radially adjacent servo regions 44. In contrast, the term "width" is defined as the radial distance from one end to the other end of a single region. For example, a servo track width 75 (shown in the data region 46 of FIG. 5 for convenience) is the width from one end to another of a single servo region 44.

For each servo region 44, the servo track pitch 74 is generally equivalent to the servo track width 75. However, for data regions 46, the data track pitch 76 is generally different from the actual data track width (not shown). Specifically, as will be understood by those skilled in the art, the data track width is generally about 80% of the data track pitch 76 due to the width of the active element of the head being typically less than the data track pitch and the presence of erase bands (not shown), which are typically found on both sides of each data region 46. For simplicity, the effects which reduce the data track width are not shown in the figures. Instead, the data track width is shown to be the same as the data track pitch.

As shown in FIG. 5, for a conventional track 40 (tracks n−2 through n+1 are shown in the figure), the STW must write two steps in order to write one servo region 44, which is equivalent to the width of one track 40, for example, track n. In other words, in conventional systems, the ratio between the STW step width 72 and the pitch 74 of the servo region 44 is 2:1.

In addition, as is well-known to those skilled in the art, the pitch 76 of the data region 46 is approximately equivalent to the pitch 74 of the servo region 44. Accordingly, in conventional systems, the ratio between the number of servo regions 44 to the number of data regions 46 is 1:1.

Relatively recently, there has been a trend to use magneto-resistive (MR) heads instead of thin-film inductive (TFI) heads to perform a disk drive's read functions. One of the main reasons for the switch is due to the greater sensitivity of MR heads over TFI heads.

Conventional MR heads have been designed so that their width is much smaller than the pitch 74 of the servo region 44. Accordingly, with reference to FIGS. 4 and 5, in conventional designs, the width of an MR head is much smaller than the width of the first, second, third and fourth servo bursts 52, 54, 56, 58.

When the MR head width is, for example, about 50% of the pitch 74 of the servo region 44, some relatively minor non-linearities exist in the system with respect to reading servo patterns 50 from the disk 12. However, these minor non-linearities generally do not drastically affect the performance of the disk drive system 10.

When the width of the MR head is reduced to much less than 50%, for example if the MR head width is 37% of the pitch 76 of the data region 46, severe non-linearities can occur. The non-linearities limit the minimum MR head width that can be used for a given data track pitch.

The aforementioned non-linearities may cause the system to improperly position a transducer when reading or writing to or from a disk. Such improper positioning could cause both read and write errors, thus, decreasing the overall performance of the disk drive 10.

Accordingly, there is a need to develop a disk drive system which will reduce the nonlinearities associated with reading servo patterns from a disk, but will still allow the use of narrower MR head read widths.

The present invention is designed to overcome the aforementioned, and other, problems and meet the aforementioned, and other, needs.

SUMMARY OF THE INVENTION

It is an object of the present invention to provide a disk diver system where the ratio between data regions and servo regions is not 1:1, so that each can be separately optimized. It is also an object of the present invention to provide a disk drive system which will reduce the non-linearities associated with reading servo patterns from a disk, but will still allow a greater amount of data to be stored on the disk as compared to conventional systems.

In accordance with the invention, a disk drive system having a disk used to store information is disclosed. In one embodiment, the disk includes a servo track having a servo track pitch and a data track having a data track pitch. The servo track pitch and the data track pitch are unequal to one another.

A method of reading data from a disk is also disclosed. The method includes the steps of: (1) providing a plurality of servo tracks, each having a track number, (2) providing a plurality of data tracks each having a data track number, wherein the number of servo tracks within a particular region of a disk are related to the number of data tracks within the particular region by a ratio defined as a TPI scale factor, (3) obtaining instructions from a host to read from a particular data track number, and (4) determining which servo track number should be used to access the particular data track.

Other objects, features and advantages of the invention will be apparent from the following specification taken in conjunction with the following drawings.

DETAILED DESCRIPTION OF THE PREFERRED EMBODIMENT

Figure 1:
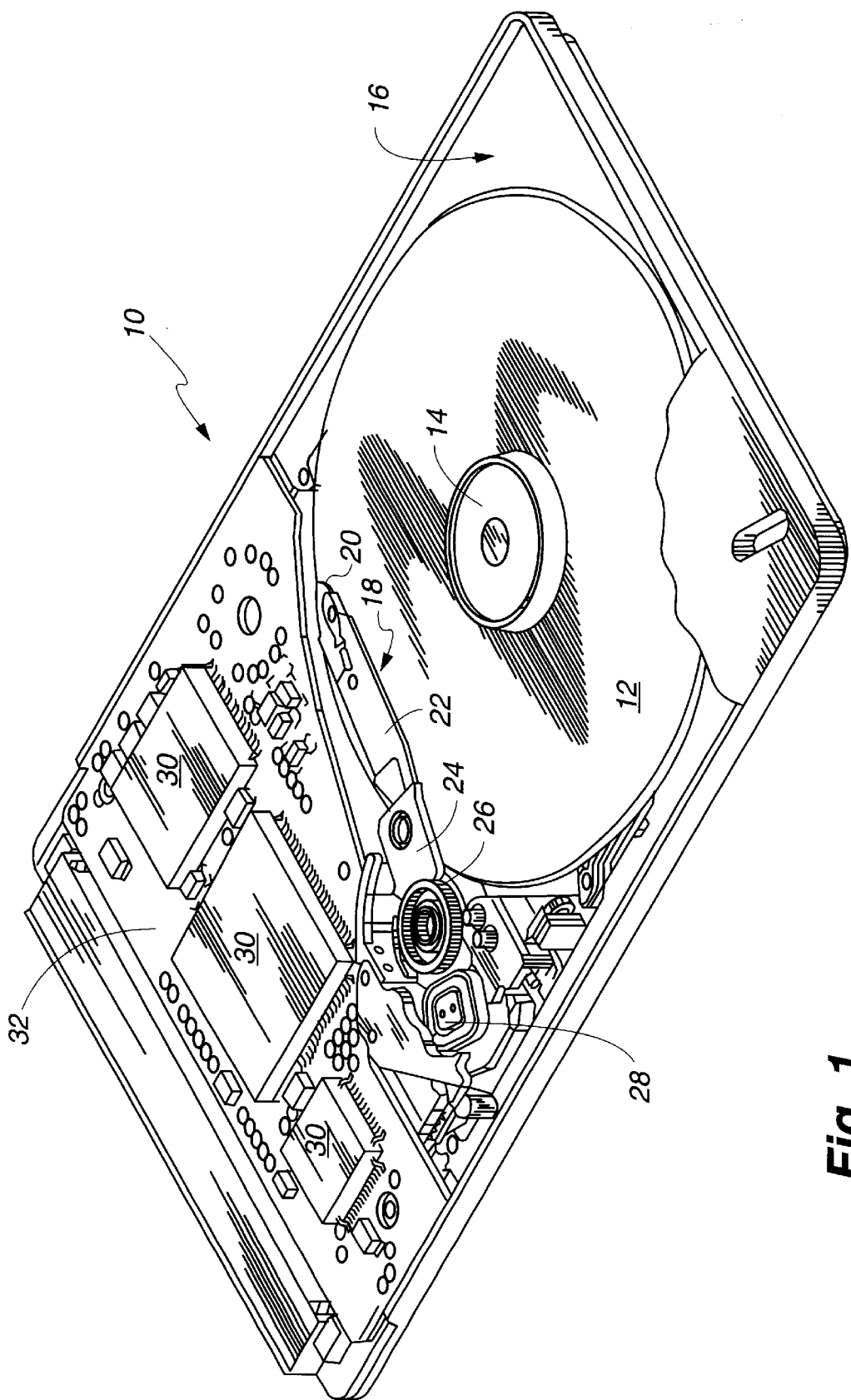
FIG. 1 illustrates a perspective view of a conventional disk drive system.
Figure 2:
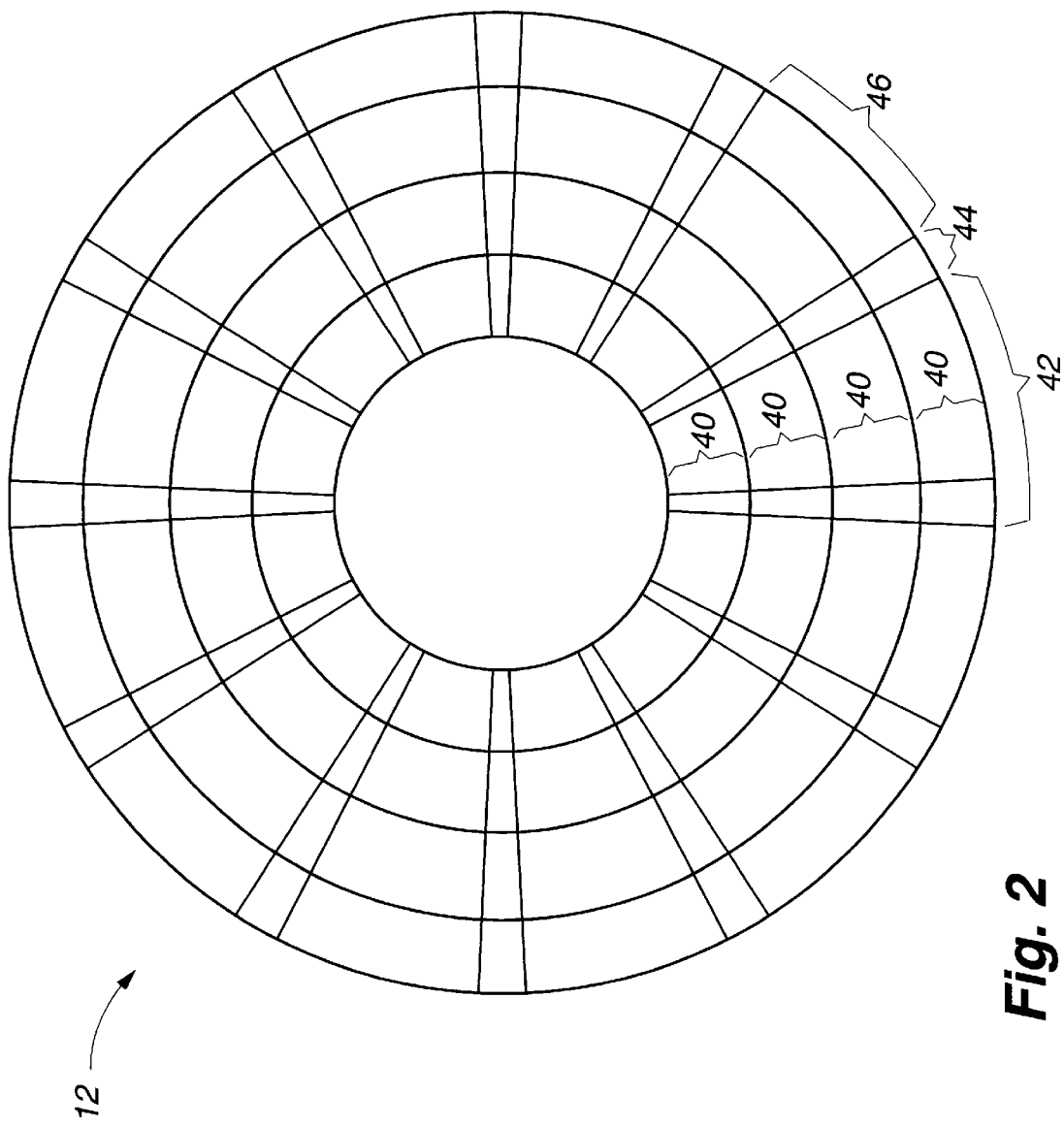
FIG. 2 illustrates a conventional disk having tracks and sectors, each of the sectors being divided into a servo region and a data region.
Figure 3:
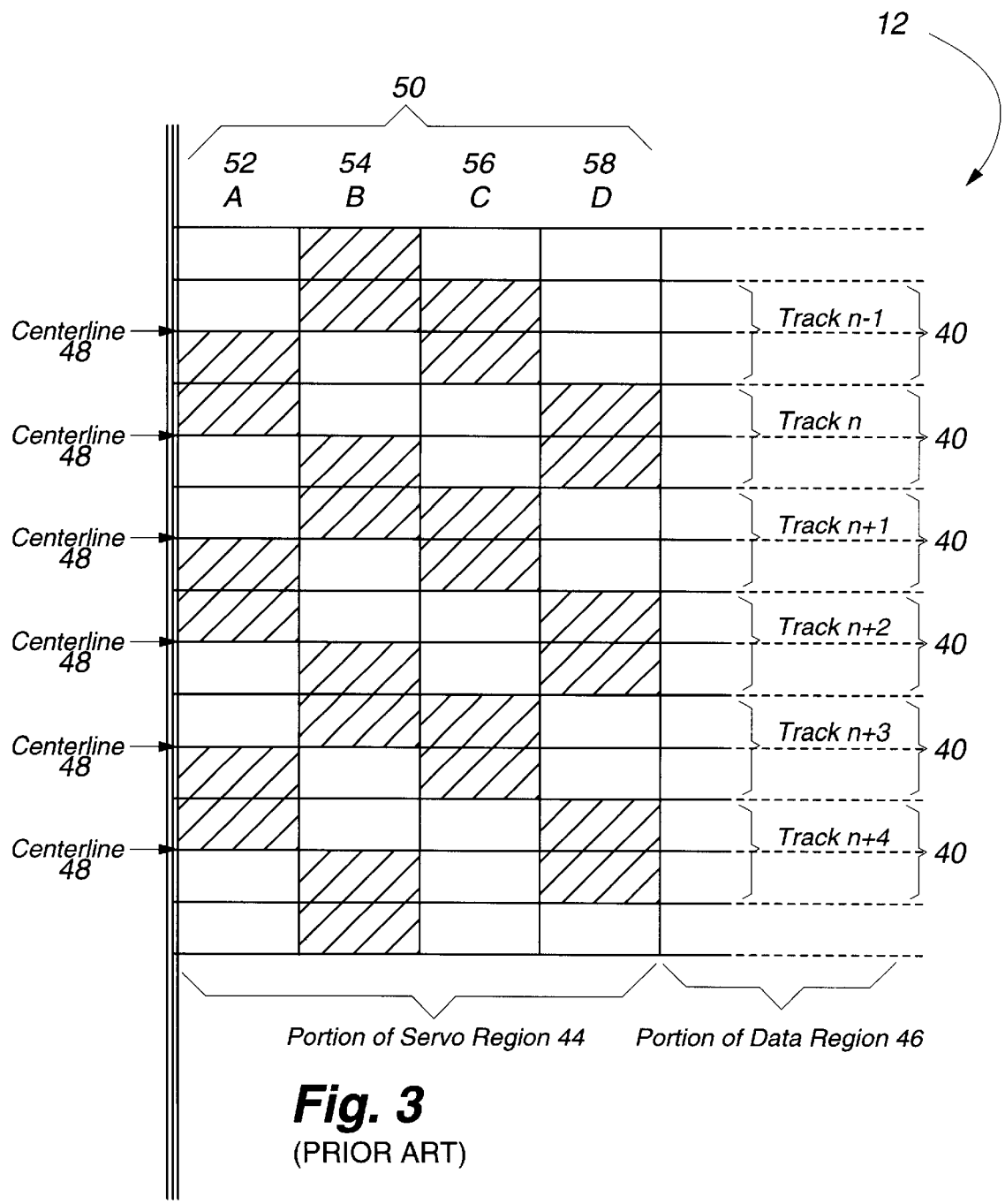
FIG. 3 illustrates portions of conventional tracks for a disk (drawn in straight, rather than arcuate, fashion for ease of depiction)
Figure 4:
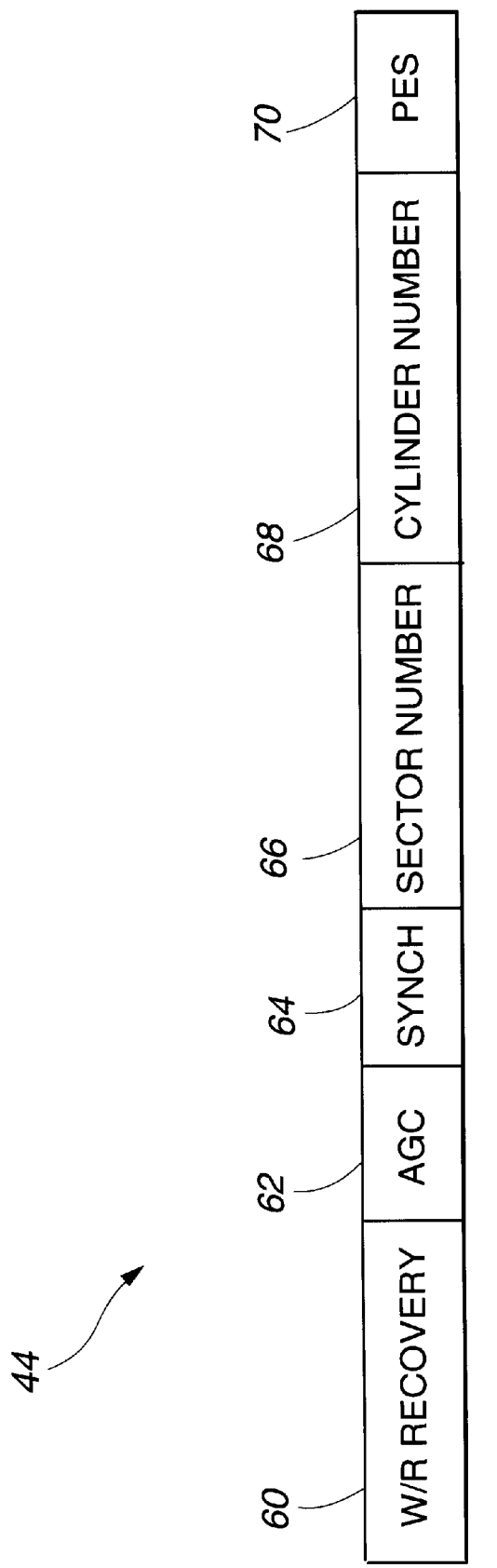
FIG. 4 illustrates components of a conventional servo region.
Figure 5:
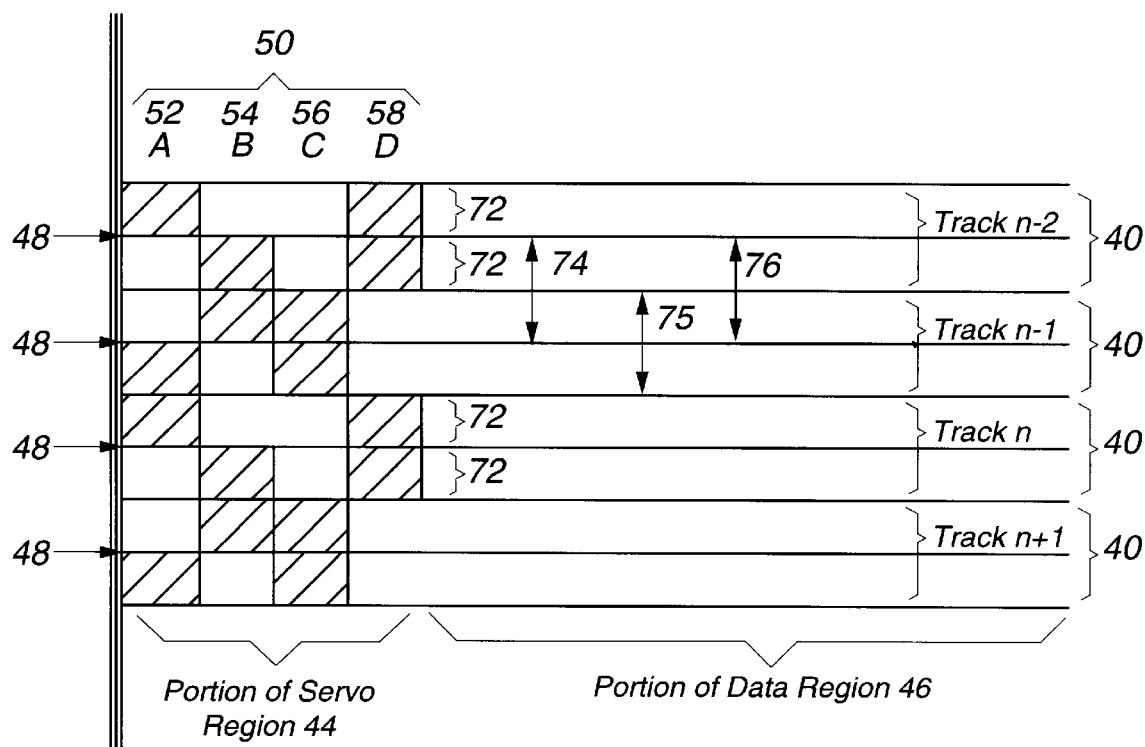
FIG. 5 illustrates portions of conventional tracks for a disk (drawn in straight, rather than arcuate, fashion for ease of depiction) and specifically shows the relationship between STW step width, servo track pitch and data track pitch for a conventional disk; and, FIG. 6 is a figure similar to FIG. 5, which illustrates portions of tracks of a disk in accordance with one embodiment of the present invention (drawn in straight, rather than arcuate, fashion for ease of depiction), and specifically shows the relationship between STW step width, servo track pitch and data track pitch for one embodiment of the present invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The inventors of the present invention have recognized that the pitch 74 of the servo region 44 and the pitch 76 of the data region 46 do not necessarily have to be equal. In fact, the inventors have recognized that the servo track pitch 74 can be optimized to a first value, while the data track pitch 76 can be separately optimized to a different second value. By doing so, certain non-linearities associated with reading the servo information written in the servo region may be minimized. Furthermore, the overall amount of data capable of being stored by the disk may be increased.

Prior to proceeding any further, it is important to define certain terms which will be used in connection with describing the invention in further detail. First, a STW step is defined as the smallest step size that the STW may write as it initially formats the disk by placing servo information thereon. The STW step is a preset value which is dependent upon a number of factors, including the nominal width of the read head, nominal width of the write head and the manufacturing tolerances associated with each.

Second, a servo track is defined as that portion of the disk which is assigned a "unique" servo track number by the STW. (It is recognized that one could design disk drive systems where servo track numbers periodically repeat. This invention is intended to encompass such systems.) In other words, when the STW writes servo information onto the disk, the servo track is defined by a certain number of STW steps which have all been assigned the same servo track number by the STW. Furthermore, consistent with the background of the invention section, the servo track pitch is defined as the distance between centers of radially adjacent servo tracks.

Third, a data track is a section of the disk capable of storing user data. In accordance with this invention, the number of data tracks are not equal to the number of servo tracks. The data track pitch is defined as the distance between centers of radially adjacent data tracks. Further understanding of the above-defined terms, and their relation to one another, should be developed by referring to the following figures and accompanying explanation.

Figure 6:
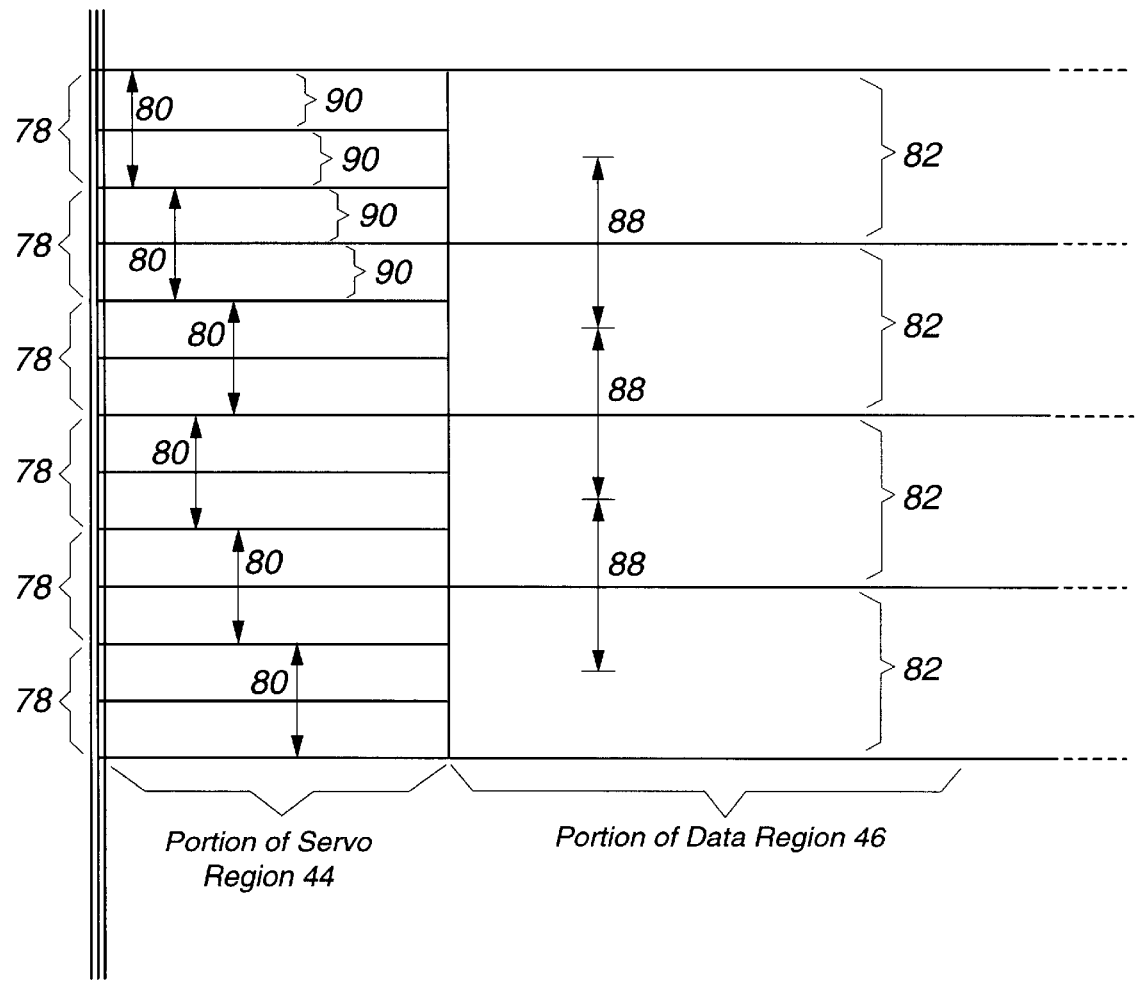

FIG. 6 illustrates servo tacks 78 each having a servo track width 80 (which is equal to its servo track pitch) and data tracks 82 each having a data track pitch 88. As shown in the figure, it took two STW steps 90 to write each servo track 78. (It should be understood that it could have taken more than two STW steps 90 to write each servo track 78.) Furthermore, as defined above, each of the servo tracks 78 was assigned a "unique" servo track number (or gray code information), even though the STW wrote the servo information contained in each of the servo tracks 78 in two steps. Additionally, the ratio between the number of STW steps 90 to servo tracks 78 is 2:1, while the ratio between the number of servo tracks 78 to data tracks 82 is 1.5:1, as is more readily apparent from comparing the total number of data tracks 82 to the total number of servo tracks 78 in FIG. 6.

In this example, the pitch 80 of the servo track 78 is 67% of the pitch 88 of the data track 82. Maintaining an approximately 50% (actually 55.5%) MR read width of pitch 80 of the servo track 78 allows a 37% read width of the pitch 88 of the data track 82. A narrower reader with respect to the data track pitch 88 is desirable for off-track read capability while a wider reader width with respect to servo track pitch 80 is desirable for reduced non-linearities in the PES.

In order to properly write data to and read data from a data track 82 when the number of data tracks 82 differ from the number of servo tracks 78, certain adjustments need to be made to the disk drive's firmware. Specifically, the ratio of servo tracks 78 to data tracks 82 (defined as the TPI scale factor) must be known. The TPI scale factor is then used to access a data track 82 using an appropriate servo track 78 via the following equation:

*Servo Track Number=Data Track Number*TPI scale factor*

More specifically, suppose, as in the above example, the TPI scale factor is 1.5, and suppose that one is attempting to read data from or write data to data track number 40. By using the above equation, the corresponding servo track number used to access data track number 40 would be servo track number 60. If one is attempting to access data track number 41, the corresponding servo track number used to access data track number 41 would be servo track number 61 with a 50% offset, since the above equation yields a result of 61.50. Likewise, if one is attempting to read data from data track number 42, the corresponding servo track number used to access data track number 42 would be servo track number 63 with a 0% offset. Similarly, for data track numbers 43 and 44, the corresponding servo track numbers would be 64 with a 50% offset and 66 with a 0% offset, respectively.

As another example, suppose that the ratio between STW steps to servo tracks is again 2:1. In addition, assume that the ratio between servo tracks to data tracks is 1.25:1. By using the above equation, to access data track number 50, the system would use servo track number 62 with a 50% offset. Similarly, to access data track number 51, the system would use servo track number 63 with a 75% offset; to access data track number 52, the system would use servo track number 65 with a 0% offset; to access data track number 53, the system would use servo track number 66 with a 25% offset; and, to access data track number 54, the system would use servo track number 67 with a 50% offset.

In another example, the number of servo tracks 78 to data tracks 82 may be 0.99:1. The appropriate servo track for accessing a specific data track would then be determined by applying the same above equation. Furthermore, the ratio between servo tracks 78 and data tracks 82 may be a function f(x) rather than a fixed value, where x is a radius, track number, data rate or bit density (the bit dens, for example, being measured in units of kiloflux changes per inch).

As mentioned above, the present invention has the specific advantage of reducing non-linearities associated with reading servo information from servo tracks 78, while allowing the data track pitch 88 to vary from the servo track pitch 80. This advantage can be further exploited by understanding that once appropriate servo tracks have been laid on the disk by the STW, one can modify the number of data tracks on a disk without having to rewrite servo tracks, since the data tracks are formatted at the drive-level rather than by the STW. In other words, once the STW has written a satisfactorily linear servo track for a particular head, the TPI scale factor may be repeatedly varied to reformat the data track portions of the disk. In contrast, in prior systems, to reformat the data regions of a disk, the servo regions would likewise have to be reformatted (due to their one to one correlation).

Although some of the above examples show a disk having constant TPI scale factor across the entirety of the disk, it should be understood that the TPI scale factor may vary over different regions of the disk. For example, as is well-known in the art, the skew angle of a head with respect to disk may vary over different regions of the disk. The TPI scale factor may be adjusted to account for these variations, as will be understood by those skilled in the art, to optimize the number of tracks that can be written on a disk surface. Furthermore, as one skilled in the art will readily understand, the TPI scale factor may differ for more than two regions of the disk.

Finally, it should be understood that servo track pitches and data track pitches may vary from disk surface to disk surface, for example, in order to account for differences between heads corresponding to such surfaces. Accordingly, servo track pitches and data track pitches may be optimized for each individual head due to variations in head widths based on manufacturing tolerances.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. In a computer disk drive, a disk comprising:
a servo track having a servo track pitch, wherein the servo track includes a servo burst; and
a data track having a data track pitch, wherein the servo track is at least partially radially aligned with the data track and the servo track pitch is less than the data track pitch.

2. The disk of claim 1 wherein the ratio between the servo track pitch and the data track pitch is an integer.

3. The disk of claim 1 wherein the ratio between the servo track pitch and the data track pitch is not an integer.

4. The disk of claim 1, wherein the data track is reformatting.

5. The disk of claim 1, wherein the data track is reformatting and the servo track is not reformatting.

6. The disk of claim 1, wherein the ratio between the servo track pitch and the data track pitch is based at least in part on a measured width of a head that reads from the disk.

7. In a computer disk drive, a disk comprising:
a servo track having a servo track pitch; and
a data track having a data track pitch, wherein the servo track is at least partially radially aligned with the data track, the servo track pitch and the data track pitch are unequal to one another, and the ratio between the servo track pitch and the data track pitch varies as a function f(x).

8. The disk of claim 7 wherein x is selected from the group consisting of:
a track number, a radius, a data rate and a bit density.

9. The disk of claim 7, wherein x is a track number.

10. The disk of claim 7, wherein x is a radius.

11. In a computer disk drive, a disk comprising:
a plurality of servo tracks, wherein each servo track includes a plurality of servo bursts; and
a plurality of data tracks, wherein the number of servo tracks is greater than the number of data tracks.

12. A method of reading data from a disk, comprising:
providing a plurality of servo tracks each having a servo track number and a servo burst;
providing a plurality of data tracks each having a data track number, wherein the number of servo tracks within a particular region of a disk is greater than the number of data tracks within the particular region in accordance with a ratio defined as a TPI scale factor;
obtaining instructions from a host to read from a particular data track; and
determining which servo track number should be used to access the particular data track.

13. The method of claim 12, wherein the servo track number is determined by the following equation:

*Servo Track Number=Data Track Number\*TPI scale factor.*

14. The method of claim 13 further comprising the step of:
using a decimal portion of the servo track number to provide an offset from the servo track to read from the particular data track.

15. A computer disk drive system comprising:
a first servo track on a first disk surface, the first servo track having a servo track pitch;
a second servo track on a second disk surface, the second servo track having the servo track pitch;
a first data track on the first disk surface, the first data track having a first data track pitch; and a second data track on the second disk surface, the second data track having a second data track pitch, wherein the first data track pitch and the second data track pitch are different from one another, the first servo track and the first data track each extend over a first region on the first disk surface at a radial distance from an axial center of the first and second disk surfaces, and the second servo track and the second data track each extend over a second region on the second disk surface at the radial distance from the axial center of the first and second disk surfaces.

16. The computer disk drive system of claim 15 wherein the first disk surface and the second disk surface are on a single disk.

17. The computer disk drive system of claim 15 wherein the first disk surface and the second disk surface are on different disks.

18. In a computer disk drive, a disk comprising:
   a servo track having a servo track pitch; and
   a data track having a data track pitch, wherein the servo track pitch and the data track pitch are unequal to one another, and the ratio between the servo track pitch and the data track pitch varies as a function of data rate.

19. In a computer disk drive, a disk comprising:
   a servo track having a servo track pitch; and
   a data track having a data track pitch, wherein the servo track pitch and the data track pitch are unequal to one another, and the ratio between the servo track pitch and the data track pitch varies as a function of bit density.

20. A method of writing servo and data tracks to a disk surface in a disk drive, comprising:
   writing a plurality of servo tracks to the disk surface, wherein the servo tracks have a servo track pitch and each of the servo tracks has a servo track width and includes a servo burst; and
   writing a plurality of data tracks to the disk surface, wherein the data tracks have a data track pitch, each of the data tracks has a data track width, the data track pitch is greater than the servo track pitch, the data track width is greater than the servo track width, and at least one of the servo tracks and one of the data tracks at least partially overlap within an annular region of the disk surface.

21. The method of claim 20, wherein the ratio between servo track pitch and the data track pitch is a fixed value.

22. The method of claim 20, wherein the ratio between the servo track pitch and the data track pitch varies as a function of track number for the data tracks.

23. The method of claim 20, wherein the ratio between the servo track pitch and the data track pitch varies as a function of radius on the disk surface.

24. The method of claim 20, wherein the ratio between the servo track pitch and the data track pitch varies as a function of data rate on the disk surface.

25. The method of claim 20, wherein the ratio between the servo track pitch and the data track pitch varies as a function of bit density on the disk surface.

26. The method of claim 20, wherein the ratio between the servo track pitch and the data track pitch is varied by reformatting the data tracks.

27. The method of claim 20, wherein the ratio between the servo track pitch and the data track pitch is varied by reformatting the data tracks without reformatting the servo tracks.

28. The method of claim 20, wherein the ratio between the servo track pitch and the data track pitch is based at least in part on a measured characteristic of a head that reads from the disk surface.

29. The method of claim 20, wherein the ratio between the servo track pitch and the data track pitch is based at least in part on a measured width of a head that reads from the disk surface.

30. A method of writing servo and data tracks to a disk surface in a disk drive, comprising:
   writing a plurality of servo tracks to the disk surface, wherein the servo tracks have a servo track pitch and each of the servo tracks includes a plurality of servo bursts; and
   writing a plurality of data tracks to the disk surface, wherein the data tracks have a data track pitch, the data track pitch is greater than the servo track pitch, and at least one of the servo tracks and one of the data tracks extend over a region of the disk surface at a fixed radial distance from an axial center of the disk surface.

31. The method of claim 30, wherein the ratio between the servo track pitch and the data track pitch is a fixed value.

32. The method of claim 30, wherein the ratio between the servo track pitch and the data track pitch varies as a function of track number for the data tracks.

33. The method of claim 30, wherein the ratio between the servo track pitch and the data track pitch varies as a function of radius on the disk surface.

34. The method of claim 30, wherein the ratio between the servo track pitch and the data track pitch varies as a function of data rate on the disk surface.

35. The method of claim 30, wherein the ratio between the servo track pitch and the data track pitch varies as a function of bit density on the disk surface.

36. The method of claim 30, wherein the ratio between the servo track pitch and the data track pitch is varied by reformatting the data tracks.

37. The method of claim 30, wherein the ratio between the servo track pitch and the data track pitch is varied by reformatting the data tracks without reformatting the servo tracks.

38. The method of claim 30, wherein the ratio between the servo track pitch and the data track pitch is based at least in part on a measured characteristic of a head that reads from the disk surface.

39. The method of claim 30, wherein the number of the servo tracks on the disk surface is greater than the number of the data tracks on the disk surface.

40. A method of reading data from a disk surface in a disk drive, comprising:
   providing a plurality of servo tracks on the disk surface, wherein the servo tracks have a servo track pitch and each of the servo tracks has a servo track number and includes a plurality of servo bursts;
   providing a plurality of data tracks on the disk surface, wherein the data tracks have a data track pitch and each of the data tracks has a data track number, the data track pitch is substantially greater than the servo track pitch, and at least one of the servo tracks and one of the data tracks extend over a region of the disk surface at a fixed radial distance from an axial center of the disk surface;
   obtaining instructions to read from a selected one of the data tracks;
   obtaining the data track number for the selected one of the data tracks;
   determining the servo track number for a selected one of the servo tracks in response to the data track number for the selected one of the data tracks; and using a head to read the servo bursts in the selected one of the servo tracks to position the head for reading data from the selected one of the data tracks.

41. The method of claim 40, wherein the ratio between the servo track pitch and the data track pitch is a fixed value.

42. The method of claim 40, wherein the ratio between the servo track pitch and the data track pitch varies as a function of track number for the data tracks.

43. The method of claim 40, wherein the ratio between the servo track pitch and the data track pitch varies as a function of radius on the disk surface.

44. The method of claim 40, wherein the ratio between the servo track pitch and the data track pitch varies as a function of data rate on the disk surface.

45. The method of claim 40, wherein the ratio between the servo track pitch and the data track pitch varies as a function of bit density on the disk surface.

46. The method of claim 40, wherein the ratio between the servo track pitch and the data track pitch is varied by reformatting the data tracks.

47. The method of claim 40, wherein the ratio between the servo track pitch and the data track pitch is varied by reformatting the data tracks without reformating the servo tracks.

48. The method of claim 40, wherein the ratio between the servo track pitch and the data track pitch is based at least in part on a measured characteristic of the head.

49. The method of claim 40, wherein the number of the servo tracks on the disk surface is greater than the number of the data tracks on the disk surface.

50. A method of writing servo and data tracks to a disk surface in a disk drive, comprising:

writing a plurality of servo tracks to the disk surface, wherein the servo tracks have a servo track pitch and each of the servo tracks has a servo track width; and writing a plurality of data tracks to the disk surface, wherein the data tracks have a data track pitch, each of the data tracks has a data track width, the data track pitch is unequal to the servo track pitch, the data track width is unequal to the servo track width, at least one of the servo tracks and one of the data tracks at least partially overlap within an annular region of the disk surface, and the ratio between the servo track pitch and the data track pitch is varied by reformatting the data tracks.

51. A method of writing servo and data tracks to a disk surface in a disk drive, comprising:

writing a plurality of servo tracks to the disk surface, wherein the servo tracks have a servo track pitch and each of the servo tracks has a servo track width; and writing a plurality of data tracks to the disk surface, wherein the data tracks have a data track pitch, each of the data tracks has a data track width, the data track pitch is unequal to the servo track pitch, the data track width is unequal to the servo track width, at least one of the servo tracks and one of the data tracks at least partially overlap within an annular region of the disk surface, and the ratio between the servo track pitch and the data track pitch is varied by reformatting the data tracks without reformatting the servo tracks.

\* \* \* \* \*